US012654762B2

(12) United States Patent
Tsujii et al.

(10) Patent No.: US 12,654,762 B2
(45) Date of Patent: Jun. 16, 2026

(54) TURNING CONTROL DEVICE

(71) Applicant: JTEKT CORPORATION, Kariya (JP)

(72) Inventors: Shunsuke Tsujii, Okazaki (JP); Yufeng Lin, Iwata (JP); Hidenori Itamoto, Tajimi (JP); Terutaka Tamaizumi, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 413 days.

(21) Appl. No.: 18/358,079

(22) Filed: Jul. 25, 2023

(65) Prior Publication Data

US 2024/0034394 A1 Feb. 1, 2024

(30) Foreign Application Priority Data

Jul. 26, 2022 (JP) .................................. 2022-118733

(51) Int. Cl.
B62D 5/04 (2006.01)

(52) U.S. Cl.
CPC .................................. B62D 5/0463 (2013.01)

(58) Field of Classification Search
CPC .............................. B62D 5/0463; B62D 5/046
See application file for complete search history.

(56) References Cited

U.S. PATENT DOCUMENTS 6,138,493 A 10/2000 Zeitlin
7,721,841 B2 * 5/2010 Shibata .................. B62D 6/008
180/407

11,668,615 B2 * 6/2023 Farshizadeh ....... B62D 15/0235
701/41
2005/0119811 A1 6/2005 Lim
2007/0107977 A1 5/2007 Shibata
2008/0027609 A1 1/2008 Aoki et al.
(Continued)

FOREIGN PATENT DOCUMENTS

JP 2003-205846 A 7/2003
JP 2007-261473 A 10/2007
(Continued)

OTHER PUBLICATIONS

Mar. 5, 2025 Notice of Allowance issued in U.S. Appl. No. 18/358,076.
(Continued)

*Primary Examiner* — Valentin Neacsu
*Assistant Examiner* — Michael R Stabley
(74) *Attorney, Agent, or Firm* — Oliff PLC

(57) ABSTRACT

A turning control device for controlling, as a controlled object, a turning apparatus including a steering wheel, an input shaft, an intermediate shaft, an output shaft, a first Cardan joint, a second Cardan joint, steered wheels, and an assist motor includes a control device. The control device configured to execute: a torque acquisition process of acquiring a detection value of a torque applied to a position closer to the steered wheels than the second Cardan joint; a steering angle variable acquisition process of acquiring a value of a steering angle variable indicative of a steering angle as an angle of the steering wheel; and an assist control process including a fluctuation torque control process of fluctuating the torque of the assist motor in accordance with the steering angle with the value of the steering angle variable being taken as an input.

5 Claims, 5 Drawing Sheets

(56)     References Cited

U.S. PATENT DOCUMENTS

| | | | |
|---|---|---|---|
| 2014/0140759 | A1 | 5/2014 | Bodtker et al. |
| 2017/0144692 | A1 | 5/2017 | Russell et al. |
| 2017/0320412 | A1 | 11/2017 | Cheon |
| 2018/0312194 | A1 | 11/2018 | Namikawa et al. |
| 2020/0195098 | A1 | 6/2020 | Shimakawa et al. |
| 2020/0290671 | A1 | 9/2020 | Farshizadeh et al. |
| 2022/0212715 | A1 | 7/2022 | Kurokawa |
| 2023/0174148 | A1 | 6/2023 | Ekström et al. |
| 2024/0060853 | A1 | 2/2024 | Garbee |

FOREIGN PATENT DOCUMENTS

| | | |
|---|---|---|
| JP | 2008-049992 A | 3/2008 |
| JP | 2008-174047 A | 7/2008 |
| JP | 2009-184370 A | 8/2009 |

OTHER PUBLICATIONS

Dec. 5, 2023 Extended Search Report issued in European Patent Application No. 23187628.5.

Dec. 13, 2023 Extended European Search Report issued in European Patent Application No. 23187633.5.

U.S. Appl. No. 18/358,076, filed Jul. 25, 2023 in the name of Shunsuke Tsujii et al.

U.S. Appl. No. 18/358,072, filed Jul. 25, 2023 in the name of Shunsuke Tsujii et al.

Oct. 14, 2025 Office Action issued in Japense Patent Application No. 2022-118733.

Oct. 14, 2025 Office Action issued in Japanese Patent Application No. 2022-118731.

Dec. 3, 2025 Notice of Allowance issued in U.S. Appl. No. 18/358,072.

* cited by examiner

TURNING CONTROL DEVICE

CROSS-REFERENCE TO RELATED APPLICATION

This application claims priority to Japanese Patent Application No. 2022-118733 filed on Jul. 26, 2022, incorporated herein by reference in its entirety.

BACKGROUND

1. Technical Field

The present disclosure relates to a turning control device.

2. Description of Related Art

For example, Japanese Unexamined Patent Application Publication No. 2003-205846 (JP 2003-205846 A) describes a device configured to transmit a torque of a steering wheel to steered wheels via a steering shaft, an intermediate shaft, and a transmission shaft. Here, the steering shaft is connected to the intermediate shaft via a universal joint, and the intermediate shaft is connected to the transmission shaft via a universal joint. Further, this device includes a motor configured to give a torque to the intermediate shaft.

SUMMARY

However, in a case of the device including the universal joints as described above, the ratio between a torque applied to the steering shaft and a torque applied to the transmission shaft changes in accordance with a steering angle. Here, the inventors of the present disclosure considered applying the torque of the motor to a position closer to the steered wheels than the universal joints. In that case, when a torque at the position closer to the steered wheels is controlled such that the torque does not fluctuate in accordance with the steering angle, a torque applied to the steering shaft fluctuates. When the torque applied to the steering shaft fluctuates, a driver might have an uncomfortable feeling.

A turning control device according to an aspect of the present disclosure controls a turning apparatus as a controlled object. The turning apparatus includes a steering wheel, an input shaft connected to the steering wheel, an intermediate shaft, an output shaft, a first Cardan joint connecting the input shaft to the intermediate shaft, a second Cardan joint connecting the intermediate shaft to the output shaft, steered wheels, and an assist motor. The steered wheels are configured to receive a steering torque input into the steering wheel, via the input shaft, the intermediate shaft, and the output shaft. The assist motor is configured to give a torque to a position closer to the steered wheels than the second Cardan joint. The turning control device includes a control device. The control device is configured to execute a torque acquisition process, a steering angle variable acquisition process, and an assist control process. The torque acquisition process is a process of acquiring a detection value of a torque applied to the position closer to the steered wheels than the second Cardan joint. The steering angle variable acquisition process is a process of acquiring a value of a steering angle variable indicative of a steering angle as an angle of the steering wheel. The assist control process includes a fluctuation torque control process of fluctuating the torque of the assist motor in accordance with the steering angle with the value of the steering angle variable being taken as an input.

In the above configuration, the ratio between the torque at the position closer to the steered wheels than the second Cardan joint and the steering torque fluctuates in accordance with the value of the steering angle variable. Accordingly, when the fluctuation of the steering torque is restrained, the torque at the position closer to the steered wheels than the second Cardan joint fluctuates. On that account, in the above configuration, the torque of the assist motor is fluctuated in accordance with the steering angle. Hereby, it is possible to restrain the fluctuation in the steering torque.

In the turning control device according to the aspect of the present disclosure, the fluctuation torque control process may include a compensating torque control process of controlling the torque of the assist motor in accordance with a torque corresponding to a value obtained by multiplying a sum of the detection value and the torque of the assist motor by a coefficient fluctuating in accordance with the steering angle.

With the compensating torque control process, in a case where the ratio between the torque at the position closer to the steered wheels than the second Cardan joint and the steering torque depends on the steering angle, it is possible to restrain the steering torque from fluctuating in accordance with the steering angle.

In the turning control device according to the aspect of the present disclosure, the fluctuation torque control process may include a steering torque dependent process of controlling the torque of the assist motor with use of a steering torque grasped from the detection value and the value of the steering angle variable as inputs.

The steering torque reflects the driver's intention of steering, and therefore, by controlling the torque of the assist motor in accordance with the steering torque, it is possible to control the torque of the assist motor in accordance with the driver's intention of steering. However, in the case of the above configuration, when the torque of the assist motor is a torque that does not depend on the steering angle, the steering torque fluctuates. In contrast, with the steering torque dependent process, by controlling the torque generated by the assist motor in accordance with the value of the steering angle variable, it is possible to fluctuate the torque of the assist motor in accordance with the steering angle. Hereby, it is possible to restrain the fluctuation in the steering torque.

In the turning control device according to the aspect of the present disclosure, the assist control process may include a process of controlling, with use of the detection value and the value of the steering angle variable as inputs, the torque of the assist motor in accordance with a steering torque determined by the detection value and the value of the steering angle variable.

In the above configuration, the ratio between the detection value and the steering torque fluctuates in accordance with the value of the steering angle variable. This means that the steering torque can be grasped based on the detection value and the value of the steering angle variable. Accordingly, in the above configuration, the torque of the assist motor is controlled in accordance with the steering torque determined by the detection value and the value of the steering angle variable. Hereby, it is possible to control the torque of the assist motor such that the torque achieves an appropriate torque corresponding to the steering torque. That is, it is possible to control the torque of the assist motor such that the torque achieves an appropriate torque corresponding to the driver's intention.

The turning control device according to the aspect of the present disclosure may further include a storage device in which mapping data is stored. The steering angle variable acquisition process may be a process of acquiring a value of a variable indicative of a rotation angle of the output shaft as the value of the steering angle variable. The mapping data may be data defining a mapping to output the steering angle with the value of the steering angle variable being taken as an input. The assist control process may include a steering angle calculation process of calculating the steering angle by inputting the value of the steering angle variable into the mapping.

The rotation angle of the output shaft and the steering angle depend on the bending angle between the input shaft and the intermediate shaft and the bending angle between the intermediate shaft and the output shaft. On that account, in a case where the rotation angle of the output shaft is used as the steering angle, the accuracy to grasp the steering angle decreases. In contrast, in the above configuration, the steering angle calculation process is executed, so that it is possible to grasp the steering angle with accuracy.

In the turning control device according to the aspect of the present disclosure, the control device may be configured to execute a steering angle acquisition process and an updating process. The steering angle acquisition process may be a process of acquiring the steering angle. The updating process may include a process of updating the mapping data with use of, as inputs, the steering angle acquired in the steering angle acquisition process and the value of the steering angle variable, the value being acquired in the steering angle variable acquisition process.

Since the relationship of the rotation angle of the output shaft with the steering angle depends on the bending angle between the input shaft and the intermediate shaft and the bending angle between the intermediate shaft and the output shaft, the paired bending angles can be grasped from the rotation angle of the output shaft and the steering angle. This means that the mapping data can be found from the rotation angle of the output shaft and the steering angle. On that account, in the above configuration, the mapping data is updated in accordance with the steering angle and the rotation angle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

The following will describe a first embodiment with reference to the drawings.

System Configuration

Figure 1:
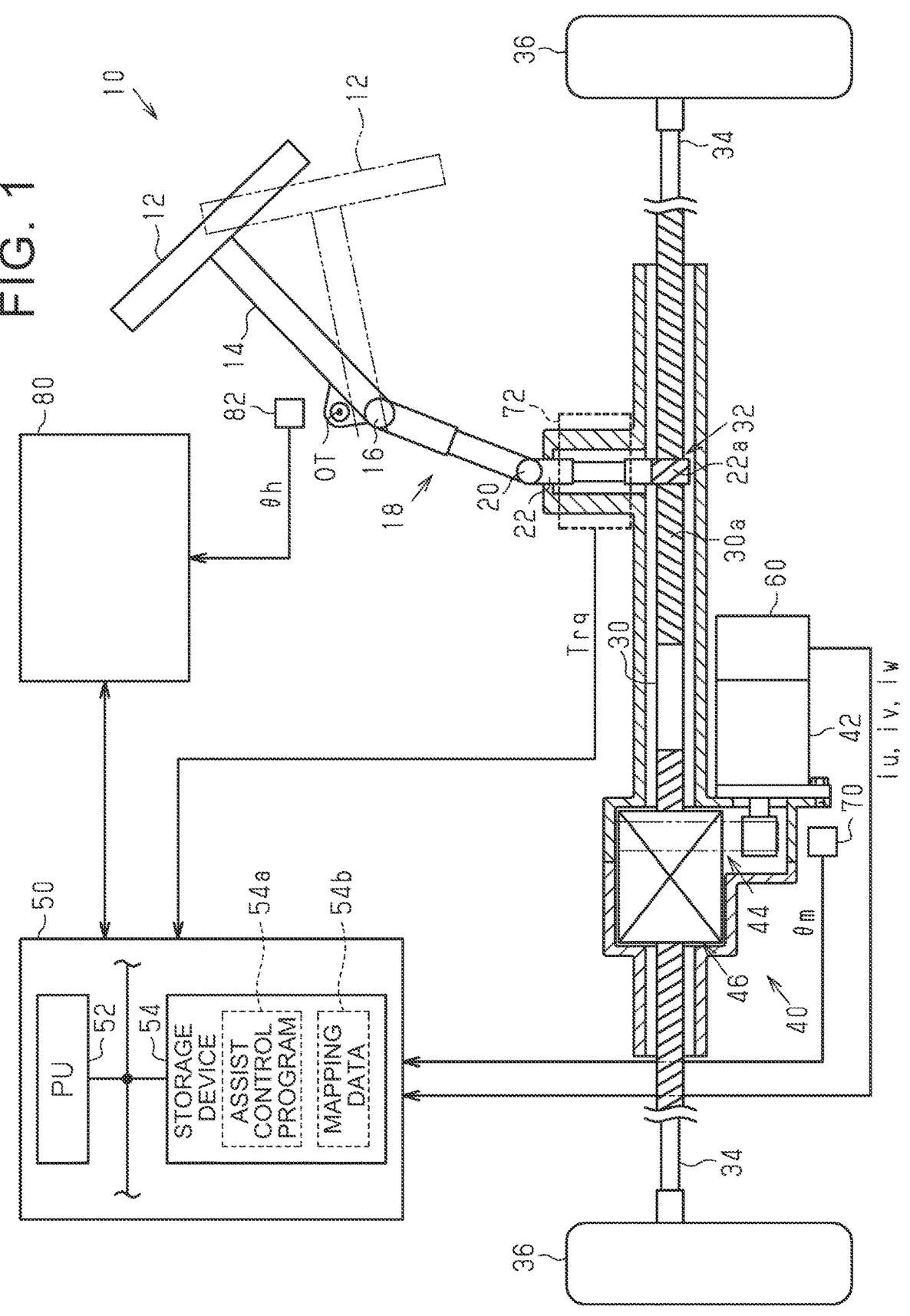
FIG. 1 is a view illustrating the configuration of a turning control system according to one embodiment.

As illustrated in FIG. 1, a turning apparatus 10 is an apparatus configured to turn steered wheels 36 by collaboration with a steering torque input into a steering wheel 12 by a driver and power of a turning actuator 40. The turning apparatus 10 is an electric power steering apparatus. In the following description, a case where the steering wheel 12 is operated in the right direction or the left direction is referred to as "steering."

The steering wheel 12 is fixed to a column shaft 14. The column shaft 14 is mechanically connected to an intermediate shaft 18 via a first Cardan joint 16. The intermediate shaft 18 has a well-known contractible configuration. Out of two end parts of the intermediate shaft 18 in its axial direction, an end part on a side reverse to an end part connected to the first Cardan joint 16 is connected to a pinion shaft 22 via a second Cardan joint 20. The column shaft 14 is an example of the input shaft.

The pinion shaft 22 is placed to have a predetermined crossing angle from the rack shaft 30. A rack-and-pinion mechanism 32 is configured such that rack teeth 30a formed on the rack shaft 30 are engaged with pinion teeth 22a formed on the pinion shaft 22. Further, respective tie rods 34 are connected to the opposite ends of the rack shaft 30. Respective distal ends of the tie rods 34 are connected to respective knuckles (not illustrated) to which the steered wheels 36 are assembled, respectively. By the rack-and-pinion mechanism 32, the rotation operation of the steering wheel 12 is converted into the displacement operation of the rack shaft 30 in the axial direction. When the displacement operation in the axial direction is transmitted to the knuckles via the tie rods 34, the turning angles of the steered wheels 36 are changed. Note that a turning angle is a steered angle of a tire as the steered wheel 36. The pinion shaft 22 is an example of an output shaft.

The turning actuator 40 includes an assist motor 42 as a drive source, a transmission mechanism 44 configured to transmit the torque of the assist motor 42, and a ball screw mechanism 46. The ball screw mechanism 46 converts the torque of the assist motor 42, transmitted via the transmission mechanism 44, into force to displace the rack shaft 30 in the axial direction. The assist motor 42 is a three-phase brushless motor as an example. An output voltage of the inverter 60 is applied to a terminal of the assist motor 42.

The control device 50 operates the inverter 60 such that the controlled amounts of the steered wheels 36 are controlled as controlled objects. The control device 50 refers to a rotation angle Om of the assist motor 42, detected by a rotation angle sensor 70, so as to control the controlled amounts. Further, the control device 50 refers to currents iu, iv, iw output from the inverter 60. Note that the currents iu, iv, iw may be grasped as voltage drop amounts of respective shunt resistors provided in legs of the inverter 60. Further, the control device 50 refers to a detection value Trq from a torque sensor 72. The detection value Trq is a detection value of a torque applied to the pinion shaft 22. The torque sensor 72 is a sensor configured to detect a torque in accordance with a torsion angle of a well-known torsion bar spring provided in the pinion shaft 22.

The control device 50 includes a PU 52 and a storage device 54. The PU 52 is a software processing device including at least one of a CPU, a GPU, a TPU, and so on.

An upper ECU 80 is an electronic control unit configured to generate a command upper than the control device 50 about the control of a vehicle. The upper ECU 80 refers to a steering angle θh detected by a steering angle sensor 82.

The steering angle θh is a rotation angle of the steering wheel 12. In other words, the steering angle θh is a rotation angle of the column shaft 14.

The control device 50 and the upper ECU 80 are communicable with each other. The control device 50 can receive the steering angle θh acquired by the upper ECU However, the sampling period of the steering angle θh is longer than the sampling period of the rotation angle θm.

Cardan Joint

Figure 2:
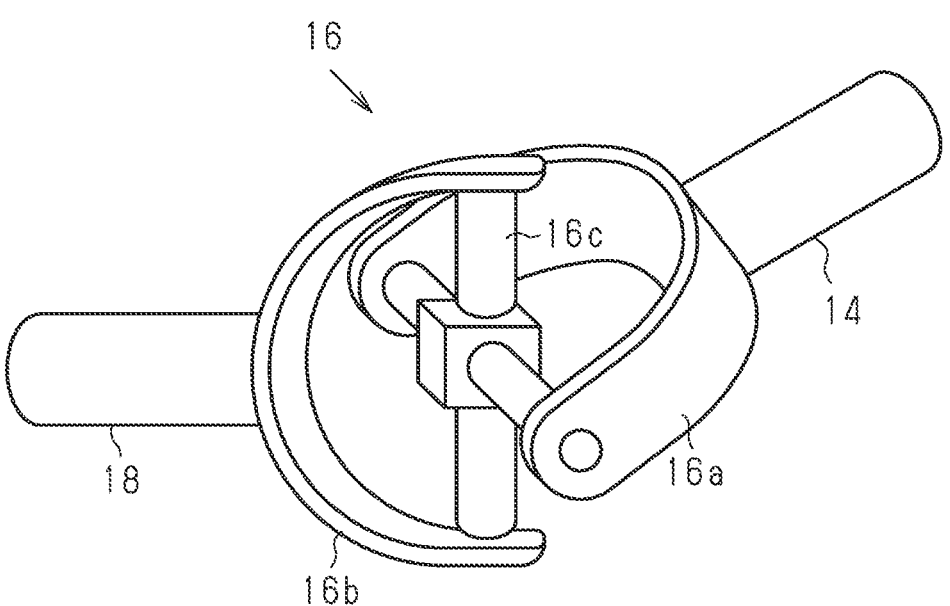
FIG. 2 is a view illustrating the configuration of a first Cardan joint according to the embodiment.

FIG. 2 illustrates the configuration of the first Cardan joint 16. The first Cardan joint 16 includes a first yoke 16*a*, a second yoke 16*b*, and a joint cross 16*c*. The joint cross 16*c* has a cross shape. The joint cross 16*c* connects the first yoke 16*a* and the second yoke 16*b* to each other such that the first yoke 16*a* and the second yoke 16*b* are rotatable. The first yoke 16*a* is fastened with an end part of the column shaft 14 by a bolt (not illustrated). Note that the first yoke 16*a* may be welded to the end part of the column shaft 14. The second yoke 16*b* is fixed to an end part of the intermediate shaft 18 by welding.

Note that the configuration of the second Cardan joint 20 is similar to the configuration of the first Cardan joint 16, and therefore, the configuration of the second Cardan joint 20 is not described herein.

Fluctuation in Torque due to Cardan Joint

A ratio f(νh) (=Th/Trq) of a steering torque Th as a torque applied to the steering wheel 12 to a torque applied to the pinion shaft 22 has a relationship expressed by Equation (c1) as follows.

$$f(\theta h) = \frac{\cos\alpha 1 \cdot \cos\alpha 2}{\left(1 - \sin^2\alpha 1 \cdot \sin^2\theta h\right) \cdot [1 - \sin^2\alpha 2\{\sin(\arctan(\tan\theta h \cdot \cos\alpha 1)) + \phi\}]^2} \quad (c1)$$

Here, a bending angle α1 of the first Cardan joint 16, a bending angle α2 of the second Cardan joint 20, and a phase difference ψ are used. The bending angle α1 of the first Cardan joint 16 is an angle formed between the axial direction of the column shaft 14 and the axial direction of the intermediate shaft 18. Further, the bending angle α2 of the second Cardan joint 20 is an angle formed between the axial direction of the intermediate shaft 18 and the axial direction of the pinion shaft 22. The phase difference ψ is "90–ξ+ε." Here, "ξ" is an angle formed between a plane parallel to both the axial direction of the column shaft 14 and the axial direction of the intermediate shaft 18 and a plane parallel to both the axial direction of the intermediate shaft 18 and the axial direction of the pinion shaft 22. Further, "ε" is a phase difference between the second yoke 16*b* as a yoke on the intermediate shaft 18 side out of two yokes of the first Cardan joint 16 and a yoke on the intermediate shaft 18 side out of two yokes of the second Cardan joint 20. The phase difference used herein indicates a deviation between rotation angles around the axial direction of the intermediate shaft 18.

According to Equation (c1), in a case where the torque applied to the pinion shaft 22 is constant without depending on the steering angle θh, for example, the steering torque Th can fluctuate in accordance with the steering angle θh. In a case where the steering torque Th fluctuates in accordance with the steering angle θh, the driver might have an uncomfortable feeling toward the operation of the steering wheel 12. The following describes a control to deal with this.

Assist Control

Figure 3:
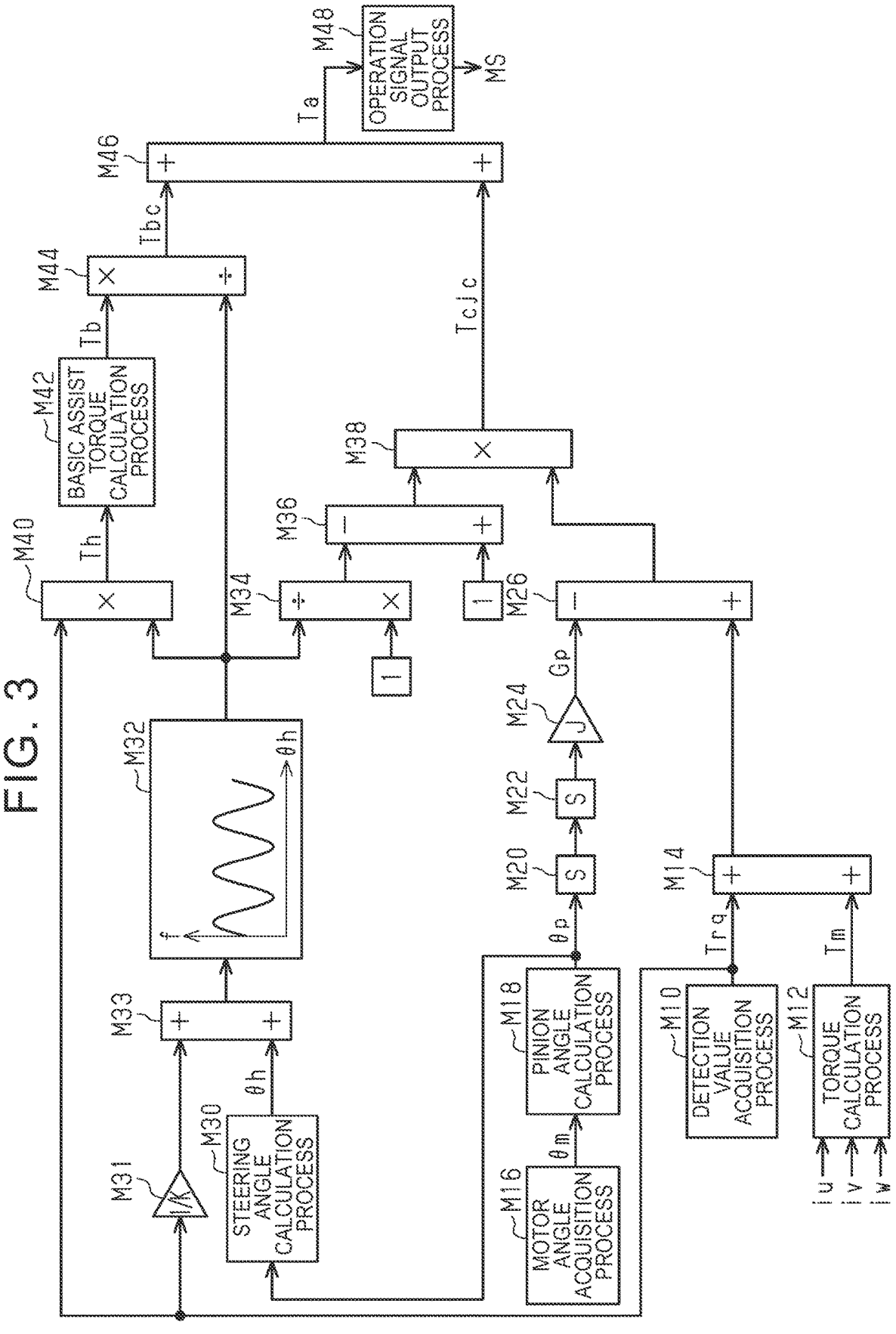
FIG. 3 is a block diagram illustrating processes executed by a control device according to the embodiment.

FIG. 3 illustrates processes executed by the control device 50. The processes illustrated in FIG. 3 are implemented by the PU 52 executing an assist control program 54*a* stored in the storage device 54 repeatedly at a predetermined cycle, for example.

A detection value acquisition process M10 is a process of acquiring a detection value Trq from the torque sensor 72 in a predetermined sampling period.

A torque calculation process M12 is a process of calculating a motor torque Tm as a torque caused in the assist motor 42 based on currents iu, iv, iw flowing through the assist motor 42. Note that the motor torque Tm is a torque obtained by converting the torque of the assist motor 42 into a torque of the pinion shaft 22 in practice.

An addition process M14 is a process of adding the detection value Trq to the motor torque Tm.

A motor angle acquisition process M16 is a process of calculating a rotation angle θm of a rotating shaft of the assist motor 42 in a predetermined sampling period. The motor angle acquisition process M16 is an example of a steering angle variable acquisition process.

A pinion angle calculation process M18 is a process of calculating a pinion angle θp that is a rotation angle of the pinion shaft 22 with the use of the rotation angle θm as an input.

A differential operator M20 is a process of calculating a first-order time differential value of the pinion angle θp with the use of the pinion angle θp as an input.

A differential operator M22 is a process of calculating a first-order time differential value of an output value in the differential operator M20 with the use of the output value in the differential operator M20 as an input.

An inertial term calculation process M24 is a process of outputting an inertial term Gp as a value obtained by multiplying an output value in the differential operator M22 by an inertial coefficient J. Note that the output value in the differential operator M22 is a second-order time differential value of the pinion angle θp, and therefore, an output value in the inertial term calculation process M24 is equivalent to an inertia torque of the turning apparatus 10.

A subtraction process M26 is a process of subtracting the output value in the inertial term calculation process M24 from the output value in the addition process M14.

A steering angle calculation process M30 is a process of calculating the steering angle θh with the use of the pinion angle θp as an input. The steering angle calculation process M30 is a process of calculating the steering angle θh by use of a mapping defined by mapping data 54*b* stored in the storage device 54 illustrated in FIG. 1. This mapping is a mapping to output the steering angle θh with the pinion angle θp being taken as an input. The mapping is defined by Equation (c2) as follows.

$$\theta h = -\arctan\frac{\tan\left[-\arctan\left\{\dfrac{\tan(\theta p + \arctan(\tan\phi \cdot \cos\alpha 2))}{\cos\alpha 2}\right\} + \phi\right]}{\cos\alpha 1} \quad (c2)$$

Equation (c2) is derived by applying an equation defining the relationship between a bending angle and a rotation angle of paired yokes in a Cardan joint to the first Cardan joint 16 and the second Cardan joint 20.

That is, Equation (c2) is derived by use of simultaneous equations of Equations (c3) and (c4) as follows.

$$\tan\theta 2 = \cos\alpha 1 \cdot \tan\theta h \qquad (c3)$$

$$\tan(\theta p') = \cos\alpha 2 \cdot \tan(\theta + \psi) \qquad (c4)$$

Note that "$\theta 2$" is the rotation angle of the intermediate shaft 18. Further, "$\theta p'$" indicates a phase difference of the pinion angle $\theta p$ from "$\theta h$." More specifically, Equation (c5) is found from Equation (c3) and Equation (c4).

$$\theta p = \theta p' - \arctan\{\tan(\psi) \cdot \cos(\alpha 2)\} \qquad (c6)$$

Accordingly, the pinion angle $\theta p$ is expressed by Equation (c6) as follows.

$$\theta p = \theta p' - \arctan\{\tan(\psi) \cdot \cos(\alpha 2)\} \qquad (c6)$$

By removing $\theta p'$ from Equation (c5) and Equation (c6), Equation (c2) is derived.

The mapping data 54$b$ includes data about values of the first bending angle $\alpha 1$, the second bending angle $\alpha 2$, and the phase difference $\psi$, and so on. Note that Equation (c1) is calculated based on the ratio between the first-order time differential value of the steering angle $\theta h$ and the first-order time differential value of the pinion angle $\theta p$ and an equation for energy conservation. Here, the ratio between the first-order time differential value of the steering angle $\theta h$ and the first-order time differential value of the pinion angle $\theta p$ can be calculated by the time derivative of Equation (c2).

A rigidity coefficient multiplication process M31 is a process of multiplying the detection value Trq by an inverse of a rigidity coefficient K. The rigidity coefficient K is a coefficient indicative of the torsional rigidity of a torsion bar spring.

A steering angle correction process M33 is a process of correcting the steering angle $\theta h$ by multiplying the steering angle $\theta h$ output in the steering angle calculation process M30 by an output value in the rigidity coefficient multiplication process M31.

A ratio calculation process M32 is a process of calculating the ratio f($\theta h$) between the torque of the pinion shaft 22 and the steering torque Th. The ratio f($\theta h$) may be expressed by Equation (c1), for example. That is, data defining Equation (c1) may be stored in the storage device 54, and the PU 52 may calculate the ratio f($\theta h$) by use of Equation (c1). Further, for example, the ratio f($\theta h$) may be calculated by a mapping operation by the PU 52 in a state where map data is stored in the storage device 54 in advance. Here, the map data is data with the steering angle $\theta h$ being taken as an input variable and the steering torque Th being taken as an output variable.

Here, the map data is set data of discrete values for an input variable and values for an output variable that correspond to respective values for the input variable. Further, the mapping operation may be a process of, in a case where a value of the input variable matches any of the values for the input variable in the map data, taking a corresponding value among the values for the output variable in the map data as an operation result. Further, the mapping operation may be a process of, in a case where a value of the input variable does not match any of the values for the input variable in the map data, taking, as an operation result, a value obtained by interpolation of the values for the output variable in the map data. Further, instead of this, the mapping operation may be a process of, in a case where a value of the input variable does not match any of the values for the input variable in the map data, taking, as an operation result, a value among the values for the output variable in the map data, the value corresponding to a closest value among the values for the input variable in the map data.

A division process M34 is a process of calculating the inverse of the ratio f($\theta h$).

A subtraction process M36 is a process of subtracting an output value in the division process M34 from "1."

A compensating torque calculation process M38 is a process of calculating a Cardan joint compensating torque Tcjc by multiplying an output value in the subtraction process M26 by an output value in the subtraction process M36.

A steering torque calculation process M40 is a process of calculating the steering torque Th by multiplying the detection value Trq by the ratio f($\theta h$).

A basic assist torque calculation process M42 is a process of calculating a basic assist torque Tb with the use of the steering torque Th as an input. That is, the basic assist torque calculation process M42 is a process of changing the basic assist torque Tb in response to the driver's intension of steering, indicated by the steering torque Th. The basic assist torque calculation process M42 may be a process of causing the magnitude of the basic assist torque Tb at the time of the magnitude of the steering torque Th being large to be equal to or more than the magnitude of the basic assist torque Tb at the time of the magnitude of the steering torque Th being small. Further, the basic assist torque calculation process M42 may be a process of setting the basic assist torque Tb to different values for turning and for turning back even when the magnitude of the steering torque Th is the same.

A fluctuation basic assist torque calculation process M44 is a process of calculating a fluctuation basic assist torque Tbc by dividing the basic assist torque Tb by the ratio f($\theta h$).

An assist torque calculation process M46 is a process of calculating an assist torque Ta by adding the fluctuation basic assist torque Tbc and the Cardan joint compensating torque Tcjc.

An operation signal output process M48 is a process of generating and outputting an operation signal MS of the inverter 60 to control the torque of the assist motor 42 to the assist torque Ta. Note that the operation signal MS is an operation signal to each switching element of the inverter 60 in practice. The operation signal output process M48 of operating the inverter 60 in accordance with the Cardan joint compensating torque Tcjc and the fluctuation basic assist torque Tbc is an example of a fluctuation torque control process. The operation signal output process M48 of operating the inverter 60 in accordance with the Cardan joint compensating torque Tcjc is an example of a compensating torque control process. The operation signal output process M48 of operating the inverter 60 in accordance with the fluctuation basic assist torque Tbc is an example of a steering torque dependent process. The operation signal output process M48 of operating the inverter 60 in accordance with the basic assist torque Tb output in the basic assist torque calculation process M42 is an example of an assist control process.

Operations and Effects of Present Embodiment

Equation (c5') is an equation of motion in the pinion shaft 22.

$$Trq + Tm = Gp + Tp \qquad (c5')$$

Here, an inertial term Gp is an inertial term in the torque of the pinion shaft 22. Further, a torque Tp is a torque except the inertial term Gp, applied to the pinion shaft 22.

Equation (c5') can be expressed as Equation (c6') as follows.

$$Trq=Gp+Tp-Tm \qquad (c6')$$

When the ratio $f(\theta h)$ of Equation (c1) is used, the steering torque Th can be expressed by Equation (c7) as follows.

$$Th=f(\theta h)\cdot(Gp+Tp-Tm) \qquad (c7)$$

Here, the motor torque Tm as an assist torque is expressed by Equation (c8).

$$Tm=Tbc+\{1-(1/f(\theta h))\}\cdot Tp \qquad (c8)$$

When Equation (c8) is substituted into Equation (c7), Equation (c9) is provided as follows.

$$Th=Tp+f(\theta h)\cdot(Gp-Tbc) \qquad (c9)$$

When "Tbc=Tb/f($\theta$h)" is substituted into Equation (c9), Equation (c10) is provided as follows.

$$Th=Tp-Tb+f(\theta h)\cdot Gp \qquad (c10)$$

When the term of "$f(\theta h)\cdot Gp$" is ignored in Equation (c10), the ratio between the steering torque Th and "Tp–Tb" does not depend on the steering angle $\theta h$.

Accordingly, when the fluctuation of the torque Tp in accordance with the steering angle $\theta h$ is small, it is possible to restrain the steering torque Th from fluctuating in accordance with the steering angle $\theta h$. Accordingly, in the present embodiment, the motor torque Tm is the sum of the fluctuation basic assist torque Tbc and the Cardan joint compensating torque Tcjc. That is, the second term in the right side in Equation (c8) is the Cardan joint compensating torque Tcjc.

Figure 4:
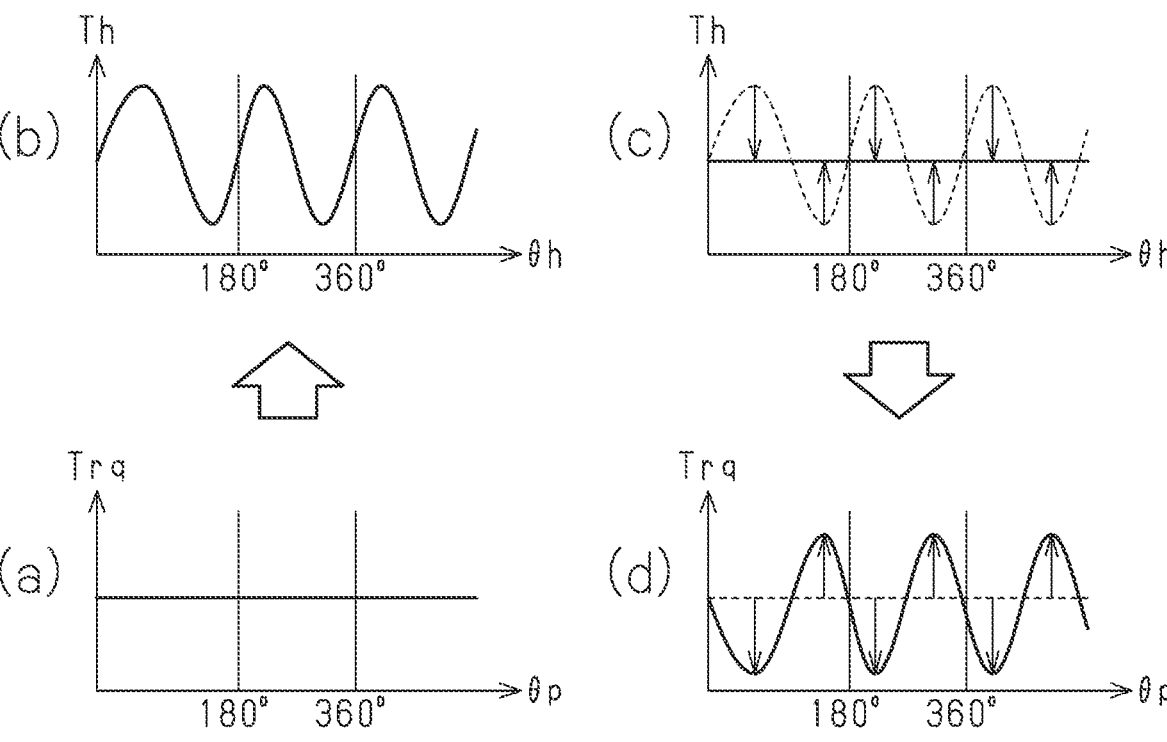
FIG. 4 is a time chart to describe operations according to the present embodiment.

The detection value Trq in a case where the motor torque Tm is the basic assist torque Tb is illustrated in (a) of FIG. 4. As illustrated in (a) of FIG. 4, the detection value Trq hardly fluctuates in accordance with the pinion angle $\theta p$. This means that the detection value Trq hardly fluctuates in accordance with the steering angle $\theta h$.

(b) of FIG. 4 illustrates the steering torque Th in the state of (a) of FIG. 4. As illustrated in (b) of FIG. 4, the steering torque Th fluctuates periodically in accordance with the steering angle $\theta h$. (c) of FIG. 4 illustrates the steering torque Th in a case where the motor torque Tm is the sum of the fluctuation basic assist torque Tbc and the Cardan joint compensating torque Tcjc. As illustrated in (c) of FIG. 4, the steering torque Th is restrained from fluctuating in accordance with the steering angle $\theta h$.

(d) of FIG. 4 illustrates the detection value Trq in a case where the motor torque Tm is the sum of the fluctuation basic assist torque Tbc and the Cardan joint compensating torque Tcjc. As illustrated in (d) of FIG. 4, the detection value Trq fluctuates in accordance with the pinion angle $\theta p$. This means that the detection value Trq hardly fluctuates in accordance with the steering angle $\theta h$.

The fluctuation of the detection value Trq, illustrated in (d) of FIG. 4, is caused by values of the first bending angle $\alpha 1$, the second bending angle $\alpha 2$, and so on. That is, the fluctuation of the detection value Trq in accordance with the steering angle $\theta h$ is irrelevant to the driver's intention of steering of the steering wheel 12. Accordingly, when the basic assist torque Tb is calculated with the use of the detection value Trq as an input, the basic assist torque Tb takes a value that fluctuates in accordance with the steering angle $\theta h$ regardless of the driver's intention. In view of this, the PU 52 calculates the basic assist torque Tb with the use of, as an input, the steering torque Th calculated by multiplying the detection value Trq by the ratio $f(\theta h)$. Hereby, the basic assist torque Tb can be made an appropriate value suitable for the driver's intention of steering.

Second Embodiment

The following will describe a second embodiment mainly about differences from the first embodiment with reference to the drawings.

In the first embodiment, the relationship between the pinion angle $\theta p$ and the steering angle $\theta h$ is considered to be constant. In contrast, in the present embodiment, the relationship between the pinion angle $\theta p$ and the steering angle $\theta h$ is updated each time by estimating the first bending angle $\alpha 1$, the second bending angle $\alpha 2$, and so on.

That is, as indicated by an alternate long and two short dashes line in FIG. 1, the column shaft 14 can adjust the height of the steering wheel 12 by rotating around a rotation center OT. When the column shaft 14 rotates around the rotation center OT, the first bending angle $\alpha 1$ and the second bending angle $\alpha 2$ can change.

Figure 5:
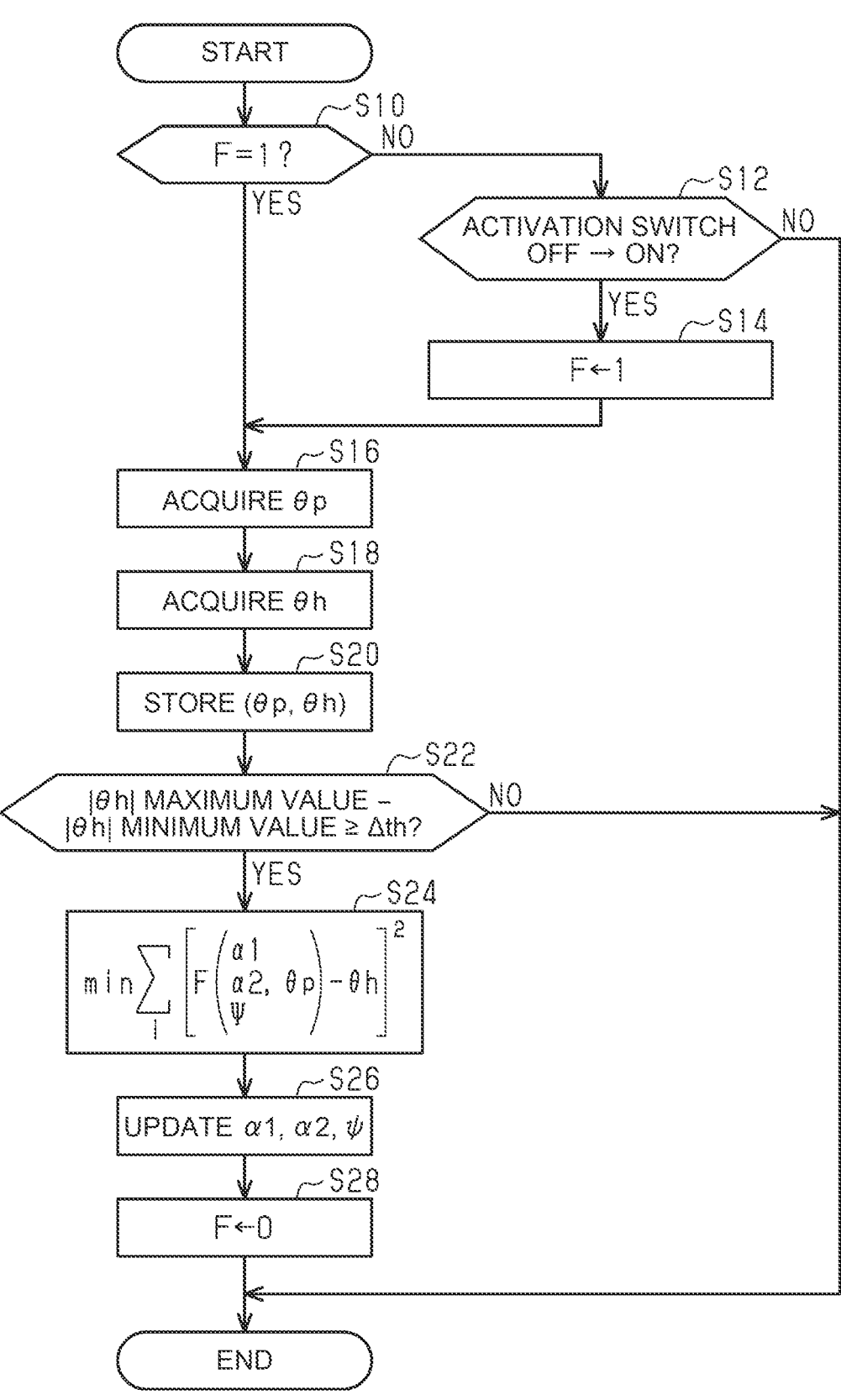
FIG. 5 is a flowchart illustrating the procedure of a process executed by a control device according to the second embodiment.

FIG. 5 illustrates the procedure of an updating process of updating the mapping data 54b. The process illustrated in FIG. 5 is implemented by the PU 52 executing the assist control program 54a stored in the storage device 54 repeatedly at a predetermined cycle, for example.

In a series of processes illustrated in FIG. 5, the PU 52 first determines whether or not an update flag F is "1" (S10). In a case where the update flag F is "1," the update flag F indicates execution of a process of updating the mapping data 54b. In a case where the update flag F is "0," the update flag F indicates non-execution of the process of updating the mapping data 54b.

In a case where the PU 52 determines that the update flag F is "0" (S10: NO), the PU 52 determines whether or not an activation switch is just switched from an OFF state to an ON state (S12). The activation switch is a switch for bringing the vehicle to a runnable state. For example, in a case where only an internal combustion engine is provided as a thrust generation device in the vehicle, the activation switch may be an ignition switch. Further, in a case where the thrust generation device in the vehicle includes a motor, the activation switch may be a switch configured to open and close an electrical path between the motor and a battery.

In a case where the PU 52 determines that the activation switch is switched to the ON state (S12: YES), the PU 52 substitutes "1" into the update flag F (S14).

In a case where the PU 52 makes an affirmative determination in the process of S10, or in a case where the PU 52 ends the process of S14, the PU 52 acquires a pinion angle $\theta p$ (S16). Further, the PU 52 acquires a steering angle $\theta h$ by communication with the upper ECU 80 (S18). Then, the PU 52 stores a set of the pinion angle $\theta p$ and the steering angle $\theta h$ in the storage device 54 (S20). The pinion angle $\theta p$ and the steering angle $\theta h$ are synchronous data. This can be achieved by setting a period of the series of processes illustrated in FIG. 5 to a reception interval of the steering angle $\theta h$, for example. The process of S18 is an example of a steering angle acquisition process.

Subsequently, the PU 52 determines whether or not the difference between a maximum value and a minimum value among absolute values of the steering angle $\theta h$, stored by the process of S20, is equal to or more than a predetermined value $\Delta th$ (S22). When the PU 52 determines that the difference is the predetermined value $\Delta th$ or more (S22: YES), the PU 52 finds a first bending angle $\alpha 1$, a second bending angle $\alpha 2$, and a phase difference by the method of least squares (S24).

That is, for each set of the pinion angle θp and the steering angle θh stored in the process of S20, the PU 52 calculates the square of the difference between a value F obtained by substituting the pinion angle θp into the right side of Equation (c2) and the steering angle θh. Then, the PU 52 searches for the first bending angle α1, the second bending angle α2, and the phase difference that minimize the sum total of respective squares of the differences of the sets of the pinion angle θp and the steering angle θh stored in the process of S20.

Subsequently, the PU 52 updates the first bending angle α1, the second bending angle α2, and the phase difference ψ defined in the mapping data 54b (S26). When the PU 52 ends the process of S26, the PU 52 substitutes "0" into the update flag F (S28). The process of S26 is an example of an updating process.

Note that, in a case where the PU 52 completes the process of S28, or in a case where the PU 52 makes a negative determination in the process of S12, S22, the PU 52 ends the series of processes illustrated in FIG. 5 once.

Other Embodiments

Note that the present embodiment can also be carried out by adding changes as stated below. The present embodiment and the following modifications can be carried out in combination as long as they do not cause any technical inconsistencies.

Steering Angle Variable Acquisition Process

In the above embodiment, the steering angle variable acquisition process is a process of acquiring the pinion angle θp as a variable indicative the steering angle, but the applicable embodiment is not limited to this. For example, the steering angle variable acquisition process may be a process of acquiring a displacement amount of the rack shaft 30 in the axial direction. Further, for example, the steering angle variable acquisition process may be a process of acquiring the steering angle θh output from the upper ECU 80, for example.

Steering Torque Dependent Process

The basic assist torque calculation process M42 of calculating the basic assist torque Tb that does not depend on the steering angle θh is not essential. For example, a process of directly calculating a fluctuation basic assist torque Tbc with the use of the steering torque Th and the steering angle θh as inputs may be employed.

Fluctuation Torque Control Process

The fluctuation torque control process is not necessary to be a process illustrated in FIG. 3. For example, a process of directly calculating the assist torque Ta with the use of the steering torque Th, the steering angle θh, and the motor torque Tm as inputs may be employed. Here, the assist torque Ta is a torque that fluctuates in accordance with the steering angle θh.

For example, the assist torque Ta may be made to have the same value as the Cardan joint compensating torque Tcjc. Even in that case, it is possible to reduce a torque pulsation applied to the steering wheel 12.

It is not necessary that the steering angle θh be used as an input in the fluctuation torque control process. For example, the pinion angle θp may be used as an input. In that case, the ratio calculation process M32 should be a process of calculating the ratio fin accordance with the first bending angle α1, the second bending angle α2, and the phase difference in addition to the pinion angle θp. In other words, the steering angle calculation process is not essential.

Updating Process

In the process in FIG. 5, the steering angle θh is received each time, but the applicable embodiment is not limited to this. For example, time series data of the steering angle θh may be received collectively. In that case, it is desirable that a time stamp be given to the steering angle θh constituting the time series data. Hereby, the PU 52 stores a sampling value of the pinion angle θp with a time stamp each time, so that time series data of a set of the steering angle θh and the pinion angle θp synchronized with each other can be obtained.

Instead of the process of S22, a process of determining whether or not a deviation amount from zero after the steering angle θh reaches around zero is equal to or more than a predetermined amount may be executed. Note that it is not necessary to execute any of the process of S22 and the processes in the abovementioned modifications.

In the process of S26, the first bending angle α1, the second bending angle α2, and the phase difference are updated, but the applicable embodiment is not limited to this. For example, the phase difference may not be updated while the first bending angle α1 and the second bending angle α2 are updated.

The method for finding the first bending angle α1 and the second bending angle α2 is not limited to the method of least squares. For example, a regression model to output the first bending angle α1 and the second bending angle α2 with the use of time series data of the pinion angle θp and the steering angle θh as inputs may be used. Note that the regression model can be learned with various combinations of the pinion angle θp and the steering angle θh, and the first bending angle α1 and the second bending angle α2 corresponding thereto being taken as training data.

A timing to start the updating process is not limited to a timing when the activation switch is switched from an OFF state to an ON state. For example, the timing may be a timing when a door of the vehicle is switched from an opened state to a closed state.

Turning Control Device

The control device 50 is not limited to a device including the PU 52 and the storage device 54 and configured to execute a software process. For example, the control device 50 may include an exclusive hardware circuit (e.g., an ASIC, and the like) configured to perform hardware processing on at least part of resultants obtained by software processing in the above embodiment. That is, the turning control device may have any of the following configurations (a) to (c).

(a) The turning control device includes a processing device configured to execute all of the above processes in accordance with a program, and a program storage device such as a ROM in which the program is stored.

(b) The turning control device includes a processing device configured to execute part of the above processes in accordance with a program, a program storage device, and an exclusive hardware circuit configured to execute the rest of the processes.

(c) The turning control device includes an exclusive hardware circuit configured to execute all of the above processes. Here, a plurality of software processing circuits including a processing device and a program storage device, or a plurality of exclusive hardware circuits may be provided. That is, the processes may be executed by a processing circuit including at least either of one or more software processing circuits and one or more exclusive hardware circuits.

Turning Apparatus

The turning apparatus is not limited to the configuration in which the rotating shaft of the assist motor 42 and the rack shaft 30 are placed in parallel to each other. For example, the turning apparatus may include a second rack-and-pinion mechanism separately from the rack-and-pinion mechanism 32 so as to give the torque of the assist motor 42 via the second rack-and-pinion mechanism.

Others

It is not necessary that the steering angle θh as an input in the ratio calculation process M32 be an output value in the steering angle correction process M33. For example, the steering angle θh output in the steering angle calculation process M30 may be an input in the ratio calculation process M32.

A factor to change the bending angles α1, α2 is not limited to the change in the tilt angle. For example, the use of a telescopic function may be the factor to change the bending angles α1, α2.

What is claimed is:

1. A turning control device for controlling a turning apparatus as a controlled object, the turning apparatus including
   a steering wheel,
   an input shaft connected to the steering wheel,
   an intermediate shaft,
   an output shaft,
   a first Cardan joint connecting the input shaft to the intermediate shaft,
   a second Cardan joint connecting the intermediate shaft to the output shaft,
   steered wheels configured to receive a steering torque input into the steering wheel, via the input shaft, the intermediate shaft, and the output shaft, and
   an assist motor configured to give a torque to a position closer to the steered wheels than the second Cardan joint, the turning control device comprising a control device configured to execute following processes:
   a torque acquisition process of acquiring a detection value of a torque applied to the position closer to the steered wheels than the second Cardan joint;
   a steering angle variable acquisition process of acquiring a value of a steering angle variable indicative of a steering angle as an angle of the steering wheel; and
   an assist control process including a fluctuation torque control process of fluctuating the torque of the assist motor in accordance with the steering angle with the value of the steering angle variable being taken as an input, wherein the fluctuation torque control process includes a compensating torque control process of controlling the torque of the assist motor in accordance with a torque corresponding to a value obtained by multiplying a sum of the detection value and the torque of the assist motor by a coefficient fluctuating in accordance with the steering angle.

2. The turning control device according to claim 1, wherein the fluctuation torque control process includes a steering torque dependent process of controlling the torque of the assist motor with use of a steering torque grasped from the detection value and the value of the steering angle variable as inputs.

3. The turning control device according to claim 1, wherein the assist control process includes a process of controlling, with use of the detection value and the value of the steering angle variable as inputs, the torque of the assist motor in accordance with a steering torque determined by the detection value and the value of the steering angle variable.

4. A turning control device for controlling a turning apparatus as a controlled object, the turning apparatus including
   a steering wheel,
   an input shaft connected to the steering wheel,
   an intermediate shaft,
   an output shaft,
   a first Cardan joint connecting the input shaft to the intermediate shaft,
   a second Cardan joint connecting the intermediate shaft to the output shaft,
   steered wheels configured to receive a steering torque input into the steering wheel, via the input shaft, the intermediate shaft, and the output shaft, and
   an assist motor configured to give a torque to a position closer to the steered wheels than the second Cardan joint, the turning control device comprising (i) a storage device in which mapping data is stored and (ii) a control device configured to execute following processes:
   a torque acquisition process of acquiring a detection value of a torque applied to the position closer to the steered wheels than the second Cardan joint;
   a steering angle variable acquisition process of acquiring a value of a steering angle variable indicative of a steering angle as an angle of the steering wheel; and
   an assist control process including a fluctuation torque control process of fluctuating the torque of the assist motor in accordance with the steering angle with the value of the steering angle variable being taken as an input, wherein:
   the steering angle variable acquisition process is a process of acquiring a value of a variable indicative of a rotation angle of the output shaft as the value of the steering angle variable;
   the mapping data is data defining a mapping to output the steering angle with the value of the steering angle variable being taken as an input; and
   the assist control process includes a steering angle calculation process of calculating the steering angle by inputting the value of the steering angle variable into the mapping.

5. The turning control device according to claim 4, wherein the control device is configured to execute following processes:
   a steering angle acquisition process of acquiring the steering angle; and
   an updating process including a process of updating the mapping data with use of, as inputs, the steering angle acquired in the steering angle acquisition process and the value of the steering angle variable, the value being acquired in the steering angle variable acquisition process.

* * * * *